United States Patent
Oresic et al.

(10) Patent No.: US 12,138,825 B2
(45) Date of Patent: Nov. 12, 2024

(54) PROCESS FOR PRODUCING A COMPONENT CONSTITUTING AN INTERCONNECTOR OF AN HTE ELECTROLYSER OR OF AN SOFC FUEL CELL

(71) Applicant: COMMISSARIAT A L'ENERGIE ATOMIQUE ET AUX ENERGIES ALTERNATIVES, Paris (FR)

(72) Inventors: Bruno Oresic, Grenoble (FR); Stéphane Di Iorio, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 863 days.

(21) Appl. No.: 17/117,897

(22) Filed: Dec. 10, 2020

(65) Prior Publication Data

US 2021/0170630 A1 Jun. 10, 2021

(30) Foreign Application Priority Data

Dec. 10, 2019 (FR) ...................................... 19 14063

(51) Int. Cl.
 *B28B 3/02* (2006.01)
 *B28B 11/12* (2006.01)
 (Continued)

(52) U.S. Cl.
 CPC .............. *B28B 3/025* (2013.01); *B28B 11/12* (2013.01); *C25B 1/04* (2013.01); *C25B 9/65* (2021.01);
 (Continued)

(58) Field of Classification Search
 CPC ............ C25B 9/65; C25B 1/04; H01M 8/026; H01M 8/0217; H01M 8/0228;
 (Continued)

(56) References Cited

U.S. PATENT DOCUMENTS

2005/0227134 A1 10/2005 Nguyen
2007/0178004 A1 8/2007 Laatsch et al.
(Continued)

FOREIGN PATENT DOCUMENTS

EP 1 880 984 A2 1/2008
FR 2 996 065 B1 2/2017
(Continued)

OTHER PUBLICATIONS

French Preliminary Search Report issued Jul. 20, 2020 in French Application 19 14063 filed on Dec. 10, 2019 (with English Translation of Categories of Cited Documents), 4 pages.
(Continued)

*Primary Examiner* — Monica A Huson
(74) *Attorney, Agent, or Firm* — Oblon, McClelland, Maier & Neustadt, L.L.P.

(57) ABSTRACT

A process for preparing a component, which may constitute an interconnector for a fuel cell (SOFC) or a high-temperature electrolyser (HTE), may include: (a) preparing a substrate made of metal alloy, the base element of which is iron (Fe) or nickel (Ni), the substrate having two main flat faces; (b) tape casting a thick ceramic layer; (c) localized removal at one or more locations, of material of the tape-cast thick ceramic layer; (d) hot pressing the green thick ceramic layer tape; and (e) grooving the thick ceramic layer so as to delimit channels that are suitable for distributing and/or collecting gases. A component may be obtained from such a process.

20 Claims, 6 Drawing Sheets

(51) Int. Cl.
*C25B 1/04* (2021.01)
*C25B 9/65* (2021.01)
*H01M 8/0208* (2016.01)
*H01M 8/0217* (2016.01)
*H01M 8/0228* (2016.01)
*H01M 8/026* (2016.01)
*H01M 8/12* (2016.01)

(52) U.S. Cl.
CPC ....... *H01M 8/0208* (2013.01); *H01M 8/0217* (2013.01); *H01M 8/0228* (2013.01); *H01M 8/026* (2013.01); *H01M 2008/1293* (2013.01)

(58) Field of Classification Search
CPC .. H01M 8/0208; H01M 8/0256; H01M 8/124; H01M 8/0258; H01M 2008/1293; B28B 3/025; B28B 11/12; Y02E 60/50; Y02E 60/36; Y02P 70/50
See application file for complete search history.

(56) References Cited

U.S. PATENT DOCUMENTS

| | | |
|---|---|---|
| 2010/0081556 A1 | 4/2010 | Heng et al. |
| 2015/0218713 A1 | 8/2015 | Laucournet et al. |
| 2020/0208275 A1 | 7/2020 | Laucournet et al. |

FOREIGN PATENT DOCUMENTS

| | | |
|---|---|---|
| JP | 2012-188324 A | 10/2012 |
| JP | 2019-29302 A | 2/2019 |
| WO | WO 2005/091408 A1 | 9/2005 |
| WO | WO 2013/171651 A2 | 11/2013 |

OTHER PUBLICATIONS

Zhu et al., "Perspectives on the metallic interconnects for solid oxide fuel cells", Journal of Zhejiang University Science, vol. 5, No. 12, XP036039903, Dec. 1, 2004, 33 pages.
Lim et al., Influence of post-treatments on the contact resistance of plasma-sprayed $La_{0.8}Sr_{0.2}MnO_3$ coating on SOFC metallic interconnector, Surface and Coatings Technology, vol. 200, No. 5-6, XP027608650, Nov. 21, 2005, 4 pages.
Blugan et al., "Development of a tape casting process for making thin layers of $Si_3N_4$ and $Si_3N_4$+TiN", Journal of the European Ceramic Society, vol. 27, No. 16, XP022282251, Oct. 15, 2007, 7 pages.
Fergus et al., "Metallic interconnect for solid oxide fuel cells", Materials Science and Engineering A 397, 2005, pp. 271-283.
Quadakkers et al., "Metallic interconnectors for solid oxide fuel cells-a review", Materials at High Temperatures 20 (2), 2003, pp. 115-127.
Yang et al., "Selection and Evaluation of Heat-Resistant Alloys for SOFC Interconnect Applications", Journal of The Electrochemical Society, 150 (9), 2003, 15 pages.
Hammer et al., "The Oxidation of Ferritic Stainless Steels in Simulated Solid-Oxide Fuel-Cell Atmospheres", Oxidation of Metals, vol. 67, No. 1-2, Feb. 2007, 38 pages.
Geng et al., "Investigation on Haynes 242 Alloy as SOFC Interconnect in Simulated Anode Environment", Electrochemical and Solid-State Letters, 9 (4), 2006, pp. A211-A214.
Shaigan et al., "A review of recent progress in coatings, surface modifications and alloy developments for solid oxide fuel cell ferritic stainless steel interconnects", Journal of Power Sources 195, 2010, pp. 1529-1542.
Li et al., "Review of bipolar plates in PEM fuel cells: Flow-field designs", International Journal of Hydrogen Energy 30, 2005, pp. 359-371.
Office Action issued Nov. 1, 2021 in corresponding Japanese Patent Application No. 2020-204898 (with English Translation), 12 pages.
Office Action issued Nov. 1, 2021 in corresponding Japanese Patent Application No. 2020-204898 (with English Translation).

PROCESS FOR PRODUCING A COMPONENT CONSTITUTING AN INTERCONNECTOR OF AN HTE ELECTROLYSER OR OF AN SOFC FUEL CELL

CROSS-REFERENCE TO RELATED APPLICATIONS

The present application claims the benefit of the filing date of French Appl. No. 1914063, filed on Dec. 10, 2019.

TECHNICAL FIELD

The present invention relates to the field of solid oxide fuel cells (SOFCs) and that of high-temperature electrolysis of water (HTE, acronym for "high-temperature electrolysis" or else HTSE, acronym for "high-temperature steam electrolysis"), also using solid oxides (SOEC, acronym for "solid oxide electrolysis cell").

The present invention relates to components made of metal alloy or ceramic constituting the interconnection devices which are subjected to high temperatures and on the one hand to a reducing atmosphere either rich in steam $H_2O/H_2$ (wet hydrogen or hydrogen rich in steam) in HTE electrolysis reactors or rich in $H_2$ in SOFC cells, and on the other hand to an oxidizing atmosphere either rich in $O_2$ in HTE reactors, or rich in air in SOFC cells, of which one of the functions is to ensure the passage of the electric current in HTE electrolysis reactors.

Electric and fluidic interconnection devices, also referred to as interconnectors or else interconnection plates, are devices that connect in series each electrochemical cell (electrolysis cell) in the stack of cells and HTE reactors, thus combining the production of each. The interconnectors thus ensure the functions of conveying and collecting current and delimit the circulation compartments (distribution and/or collection) of the gases.

In addition to these functions, the interconnectors must be able to withstand corrosion in atmospheres that may be very aggressive (oxidizing or reducing) in very high temperature ranges, typically between 600 and 900° C., such as atmospheres rich in steam $H_2O/H_2$ on the cathode side of HTE electrolysers, which corrosion may be harmful to the durability of these electrolysers.

In addition, the interconnectors must have in these atmospheres a thermomechanical behaviour close to that of electrochemical cells so as to conserve good leaktightness between compartments with cathodes, known as the cathode compartments, and compartments with anodes, known as the anode compartments.

The present invention more particularly aims to simplify the production of the contact layers between interconnectors of channel plate type and cells, and to reduce the manufacturing cost thereof, so as to reduce the manufacturing cost of an HTE electrolyser or of an SOCF fuel cell equipped therewith and to decrease scrap during production. The invention also aims to improve the electrical contact between an interconnector and an electrochemical cell against which it bears.

PRIOR ART

An SOFC fuel cell or an HTE electrolyser consists of a stack of individual units that each comprise a solid oxide electrochemical cell, consisting of at least three anode/electrolyte/cathode layers superposed on one another, and of interconnecting plates made of metal alloys, also referred to as bipolar plates or interconnectors. The function of the interconnectors is both to let electric current pass and gases flow to each cell (injected steam and extracted hydrogen and oxygen in an HTE electrolyser; injected air and hydrogen and extracted water in an SOFC cell) and to separate the anode and cathode compartments, which are the gas-flow compartments on the anode side and the cathode side of the cells, respectively.

To perform the HTE electrolysis of steam at high temperature, typically between 600 and 950° C., $H_2O$ steam is injected into the cathode compartment. Under the effect of the current applied to the cell, the dissociation of the water molecules in vapor form takes place at the interface between the hydrogen electrode (cathode) and the electrolyte: this dissociation produces dihydrogen gas $H_2$ and oxygen ions. The dihydrogen is collected and evacuated at the outlet of the hydrogen compartment. The oxygen ions $O_2^-$ migrate through the electrolyte and recombine as dioxygen at the interface between the electrolyte and the oxygen electrode (anode).

To ensure the functioning of an SOFC fuel cell, air (oxygen) is injected into the cathode compartment and hydrogen is injected into the anode compartment. The hydrogen $H_2$ becomes converted into $H^+$ ions and releases electrons that are captured by the anode. The $H^+$ ions arrive at the cathode, where they combine with the $O_2^-$ ions constituted from the oxygen of the air, to form water. The transfer of the $H^+$ ions and of the electrons to the cathode produces a continuous electrical current from the hydrogen.

Since the conditions of functioning of an HTE electrolyser are very similar to those of an SOCF fuel cell, the same technological constraints are found, i.e. mainly the mechanical strength with respect to the thermal cycles of a stack of different materials (ceramics and metal alloy), the maintenance of leaktightness between the anode and cathode compartments, the resistance to ageing of the metal interconnectors and the minimization of the ohmic losses at various interfaces of the stack.

Chromia-forming ferritic stainless steels are among the interconnector alloys that are the most promising for HTE electrolysers, given that they have already been successfully used as alloys in SOFC high-temperature fuel cells [1-3]. Among these interconnector alloys, those already marketed under the names Crofer 22 APU and Crofer 22 H based on Fe-22% Cr, by the company ThyssenKrupp VDM, or the product under the name Sanergy HT based on Fe-22% Cr, by the company Sandvik, or alternatively the product under the name K41X by the company APERAM for operating temperatures of between 600 and 900° C. Alloys of this type may have a coefficient of thermal expansion in the region of that of cell materials and relatively good corrosion resistance when compared with other metal materials. Nevertheless, it requires a certain number of coatings intended, firstly, to protect it against oxidation and to prevent the evaporation of the Cr under the operating conditions, which, on the oxidizing side, pollute the electrode with air and considerably degrade its function, and, secondly, a coating that makes it possible to minimize the electrical resistance between the interconnector and the cell.

It is known that the resistance to oxidation in air of these alloys is ensured by the formation of a surface layer of chromium-rich oxides (chromia $Cr_2O_3$ and spinel oxide $(Cr,Mn)_3O_4$) [4].

However, with such bare alloys, it is known that operating requirements are not fully satisfied over time for the application to interconnectors facing the oxygen electrode, i.e.

SOCF cathode interconnectors and HTE anode interconnectors. Firstly, it appears that the area-specific resistance (ASR), linked to the collection of the current, thus becomes too high on the oxygen electrode side [1, 3]. Furthermore, the ASR in wet hydrogen, on the hydrogen electrode side, is greater than that in air [5]. Furthermore, the volatility of chromia $Cr_2O_3$ at the operating temperature causes poisoning of the HTE oxygen electrode (HTE anode), which is accompanied by a degradation in its performance, comparable to that observed for the SOCF oxygen electrode (SOCF cathode).

The literature thus describes coatings, on the one hand, for SOFC cell interconnectors, and, on the other hand, for the face of the interconnectors facing the oxygen electrode [6]. These coatings have the sole function of limiting the evaporation of chromium, of ensuring electron conduction and good resistance to oxidation of the alloy in air, i.e. in the atmosphere in cathode compartments of SOCF cells. Among these coatings, it is known practice to produce deposits conforming to the geometry of the interconnectors, of two conductive ceramic layers, one known as the protective layer whose function is to protect the metal alloy from oxidation (oxidizing compartment), and the second, known as the electrical contact layer, in order to improve the electrical contact between the interconnector and the cell, the flatness or surface finish of which are often imperfect, the measured unevenness or surface finish defect possibly ranging up to 40 micrometres.

As regards the geometry of the interconnectors, FIGS. 1, 1A and 1B show a channel plate 1 commonly used both in HTE electrolysers and in SOFC fuel cells. The conveyance or collection of the current at the electrode is performed by the teeth or ribs 10 which are in direct mechanical contact with the electrode concerned. The introduction of steam at the cathode or of draining gas at the anode in an HTE electrolyser, the introduction of air ($O_2$) at the cathode or of hydrogen at the anode in an SOCF cell is symbolized by the arrows in FIG. 1. The collection of the hydrogen produced at the cathode or of the oxygen produced at the anode in an HTE electrolyser, the collection of the water produced at the cathode or of the excess hydrogen at the anode in an SOCF cell is performed by the channels 11 which emerge in a fluidic connection, commonly known as a manifold, which is common to the stack of cells. The structure of these interconnectors is made to achieve a compromise between the two functions of introduction and of collection (gas/current).

Another interconnecting plate 1 has already been proposed [7]. It is represented in FIG. 2 with the circulation of the fluid represented by the arrows: its structure is of interdigital type.

The major drawbacks of this channel plate or plate of interdigital structure are associated with the technique for producing them. Thus, these plate structures require a large thickness of material, typically from 5 to 10 mm, for the zone for collection of the gases produced and forming by machining in the bulk, of the gas distribution channels. A photographic representation of such a machined plate is given in FIG. 3. The material and machining costs are high and directly linked to the fineness of pitch of the channels to be machined: more particularly inter-channel distances of less than 1 mm.

The use of thin sheet metals, typically from 0.5 to 2 mm, drawn and then assembled together by laser welding has already been tested. A photographic representation of such a plate obtained by assembling drawn sheet metals is given in FIG. 4. This technique has the advantage of limiting the cost of starting material, but does not make it possible to achieve a channel fineness as high as that by machining. Specifically, the possibilities of production for the depth of the channels, the unit tooth width and the pitch between teeth are limited. Furthermore, the cost of the drawing tooling necessitates mass production.

A large number of developments have been achieved with the aim of improving the electrical contact between cells and interconnectors and the management of fluids to the cell.

In particular, patent FR2996065B1 in the name of the applicant discloses, as interconnector, a component comprising a substrate made of metal alloy, the base element of which is iron (Fe) or nickel (Ni), with one of the main flat faces coated with a thick metal or ceramic layer, which is grooved, delimiting channels that are suitable for distributing and/or collecting gases, such as $H_2O$ steam, $H_2$; $O_2$, draining gas.

The applicant has used this solution in particular on the side of the oxygen electrode (anode in HTE, cathode for an SOFC cell), with a thick contact layer made of ceramic based on strontium-doped lanthanum manganite. This solution gives good performance with a good homogeneity in the stacks intended for solid oxides (SOEC/SOFC), for low production costs.

As described in this patent FR2996065B1, to produce this thick layer, deposition by hot pressing can be carried out, followed by a step of grooving by laser ablation performed so as to delimit channels that are suitable for distributing and/or collecting gases. This technique was favoured since it enables good control of the thickness of the ceramic layer and also a good repeatability of geometry of the channels.

More specifically, the ceramic layer is produced beforehand by strip casting of a mixture of strontium-doped lanthanum manganite (LSM), a dispersant, various solvents, and a plasticizer.

Once the strip of LSM has been obtained, it is put in place on one of the flat faces of the metal substrate by hot pressing.

In practice, the inventors were able to observe that the current hot-pressing process was not optimal. Indeed, as shown in FIG. 5, formation of bubbles was revealed between the metal substrate of the interconnector and the green strip of LSM during the evaporation of solvent. In this FIG. 5, the bubbles (B) are trapped between the metal substrate 12 and the LSM strip 13 of the interconnector 1.

In fact, these bubbles prevent a good adhesion of the LSM strip on the interconnector. And, in these zones, during the laser ablation grooving, there is a high risk of a phenomenon of delamination of the channels during the production thereof. This phenomenon is clearly revealed in FIG. 6 where portions 130 of green strips completely delaminated from the underlying substrate 12 are seen.

The inventors have estimated that this delamination phenomenon may extend up to 50% scrap in mass production.

There is thus a need to improve the interconnectors for SOFC cells or HTE electrolysers, produced according to the teaching of patent FR2996065B1, especially in order to reduce scrap during mass production.

The aim of the invention is to at least partly satisfy this need.

DESCRIPTION OF THE INVENTION

To do this, the invention relates, in one of its aspects, to a process for preparing a component, intended to constitute an interconnector for a fuel cell (SOFC) or a high-temperature electrolyser (HTE), comprising the following steps:

a/ preparing a substrate made of metal alloy, of chromia-forming type, the base element of which is iron (Fe) or nickel (Ni), the substrate having two main flat faces, b/ tape casting a thick ceramic layer;

c/ localized removal at one or more locations, of material of the tape-cast thick ceramic layer;

d/ hot pressing the green thick ceramic layer tape;

e/ grooving the thick ceramic layer so as to delimit channels that are suitable for distributing and/or collecting gases, such as $H_2O$ steam, $H_2$; air.

According to an advantageous implementation variant, step c/ is carried out by laser ablation, preferably by means of a $CO_2$ laser. Laser ablation makes it possible to carry out the removal step rapidly, regularly and precisely.

Advantageously, the removed material zones form holes which have one or more of the following characteristics:

each hole has a surface area of between $10^{-9}$ and $10\ mm^2$, preferably of the order of $10^{-5}\ mm^2$;

the number of holes is between 0.01 and 1000 per $cm^2$ preferentially 1 per $cm^2$, it being understood that larger holes at the surface will result in a smaller number of holes.

According to another advantageous implementation variant, the removed material zones are uniformly distributed on the surface of the thick ceramic layer, which makes material removal easier.

The expression "uniformly distributed", is understood to mean that the removed material zones follow an isotropic distribution on the surface of the thick ceramic layer. Thus, the distribution of the removed material zones immediately next to a given removed material zone is identical for all the removed material zones, with the exception of those located at the edges of the thick layer.

Preferably, the removed material zones each have a cylinder shape opening onto the metal substrate.

Preferably also, step e/ is carried out by laser ablation, before carrying out the hot-pressing step d/. It is preferable to carry out the laser ablation before hot pressing in order to avoid degrading the substrate of the interconnector present under the contact layer.

According to another advantageous implementation variant, step d/ of hot pressing the green ceramic layer is carried out at a temperature between 60 and 130° C.

Advantageously, step d/ of hot pressing the green ceramic layer is carried out for a time of less than 2 hours.

Another subject of the invention is a component obtained according to the preparation process which has just been described, the material of the thick ceramic layer being chosen from a lanthanum manganite of formula $La_{1-x}Sr_xMO_3$ with M (transition metals)=Ni, Fe, Co, Mn, Cr, alone or as a mixture, or materials of lamellar structure such as lanthanide nickelates of formula $Ln_2NiO_4$ (Ln=La, Nd, Pr), or another electrically conductive perovskite oxide or else any oxygen electrode for a fuel cell operating between 500 and 1000° C.

Preferably, the thickness of the ceramic layer is between 30 and 800 μm.

It is pointed out that, in the context of the invention, the term "thick layer" means a layer whose thickness is greater than that of a layer obtained via a "thin-film" technique, typically the thickness is between 2 and 15 μm.

The invention therefore essentially consists in creating zones devoid of green tape material, which facilitate the evaporation of any volatile material such as hot air, binder, solvent or plasticizer, which may evaporate even partially during the hot pressing to eliminate, or at the very least limit, the bubble phenomenon.

After the tape casting, discrete material removal, preferably on a micrometre scale, is therefore carried out on the tape.

After the hot-pressing step, the bubble phenomenon is nonexistent.

Owing to the invention, the time for the implementation of the hot pressing may be considerably reduced.

There are many advantages of the invention, among which mention may be made of:

a process that is viable on an industrial scale;

due to the considerably reduced time for the hot-pressing step, an overall time saving for the process which is considerable compared to the process according to patent FR2996065B1, typically by up to a factor of 60;

a saving of material and time spent resupplying the ceramic tapes;

very low production scrap rates, typically less than 1%.

Other advantages and characteristics of the invention will emerge more clearly on reading the detailed description of implementation examples of the invention given as nonlimiting illustrations in reference to the following figures.

DETAILED DESCRIPTION

FIGS. 1 to 6, which relate to the prior art have already been commented on in the preamble. They are therefore not described in detail hereinbelow.

Figure 7:
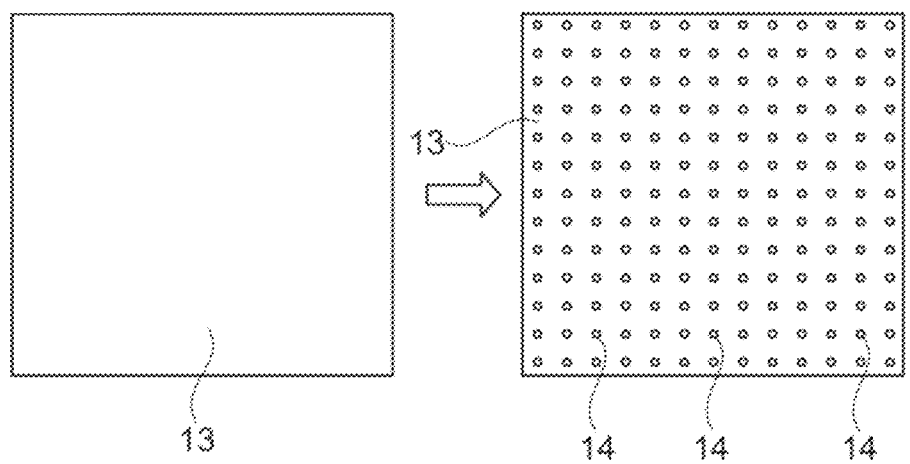
FIG. 7 is a schematic view showing the step of localized removal of material from the thick ceramic layer according to the invention.

FIG. 7 illustrates an example of localized removal of material from a thick ceramic layer 13 which takes place after the tape casting of the latter in accordance with the invention.

Figure 1:
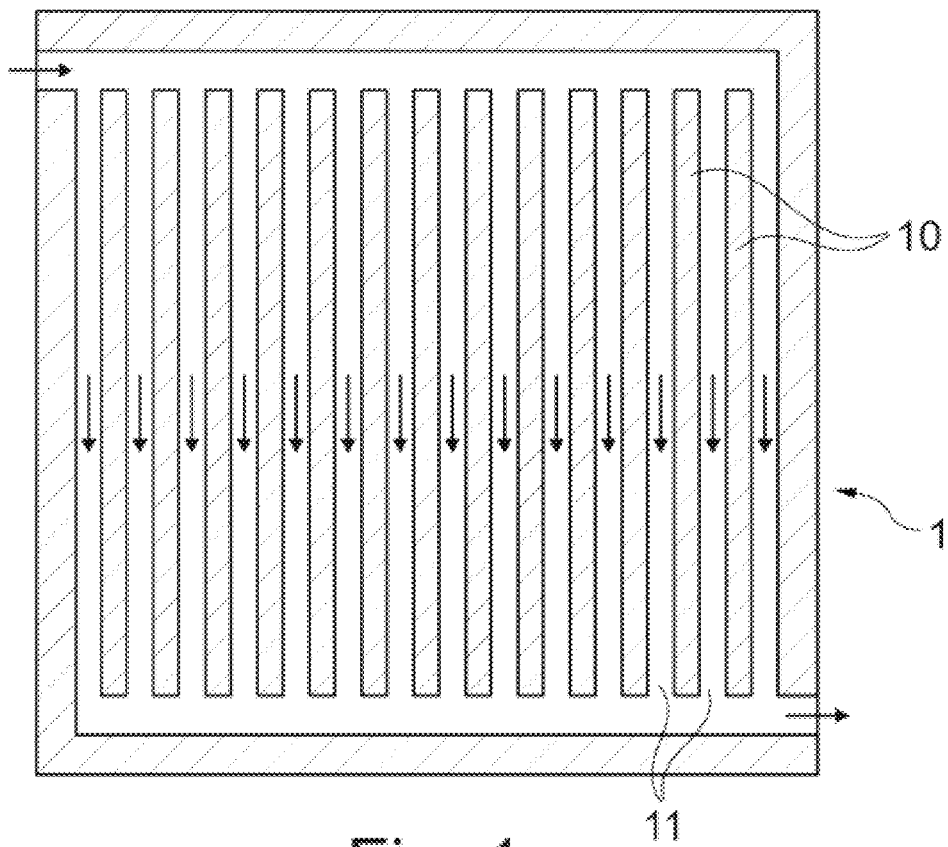
FIG. 1 is a schematic front view of an interconnecting plate of an HTE electrolyser according to the prior art.
Figure 1A:
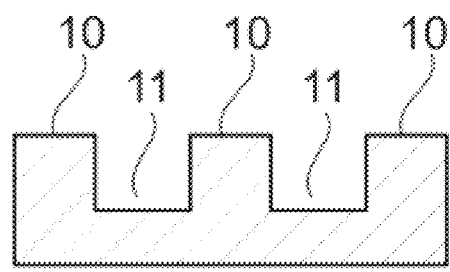
FIG. 1A is a detailed cross-sectional view of an interconnecting plate according to FIG. 1.
Figure 1B:
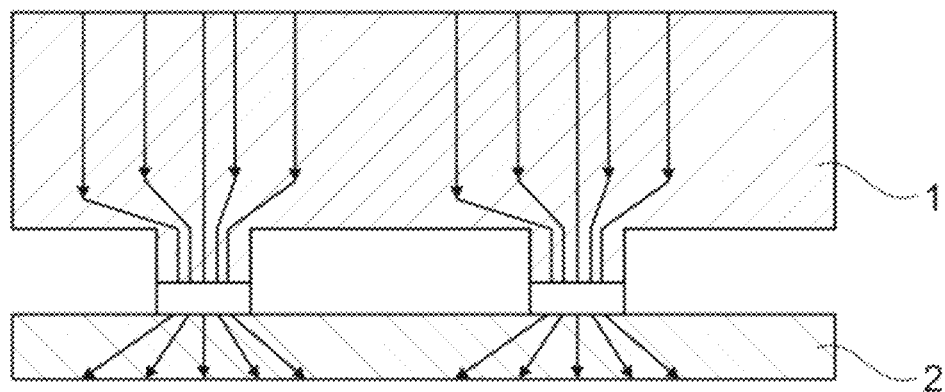
FIG. 1B is a view similar to that of FIG. 1A showing the current lines passing through the plate.
Figure 2:
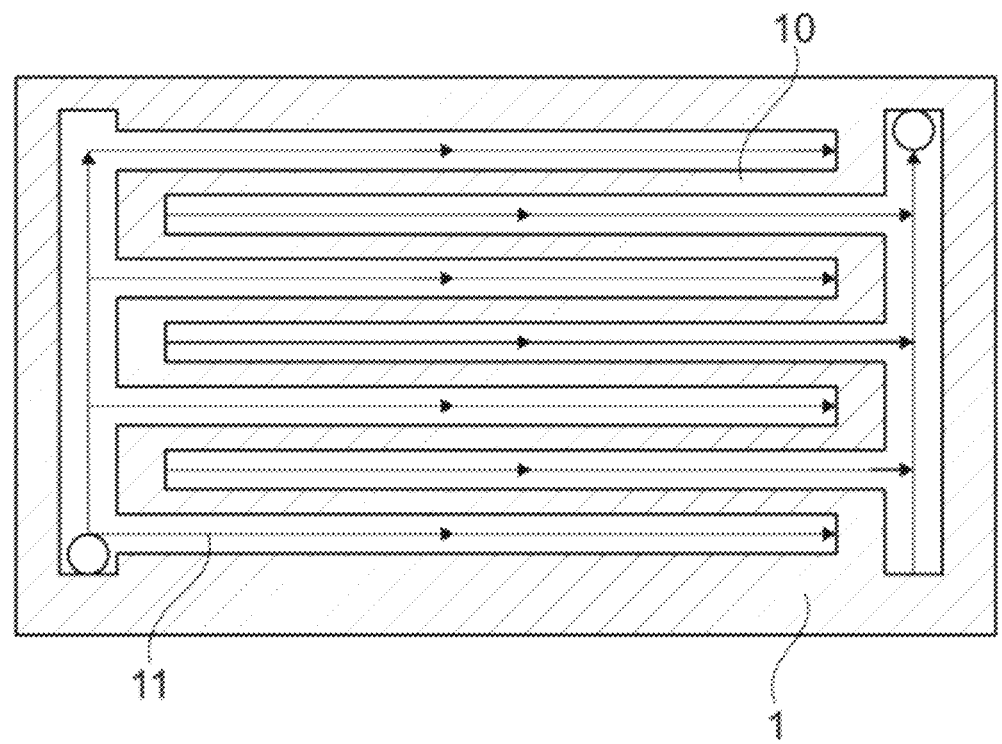
FIG. 2 is a schematic front view of another interconnecting plate of an electrolyser according to the prior art.
Figure 3:
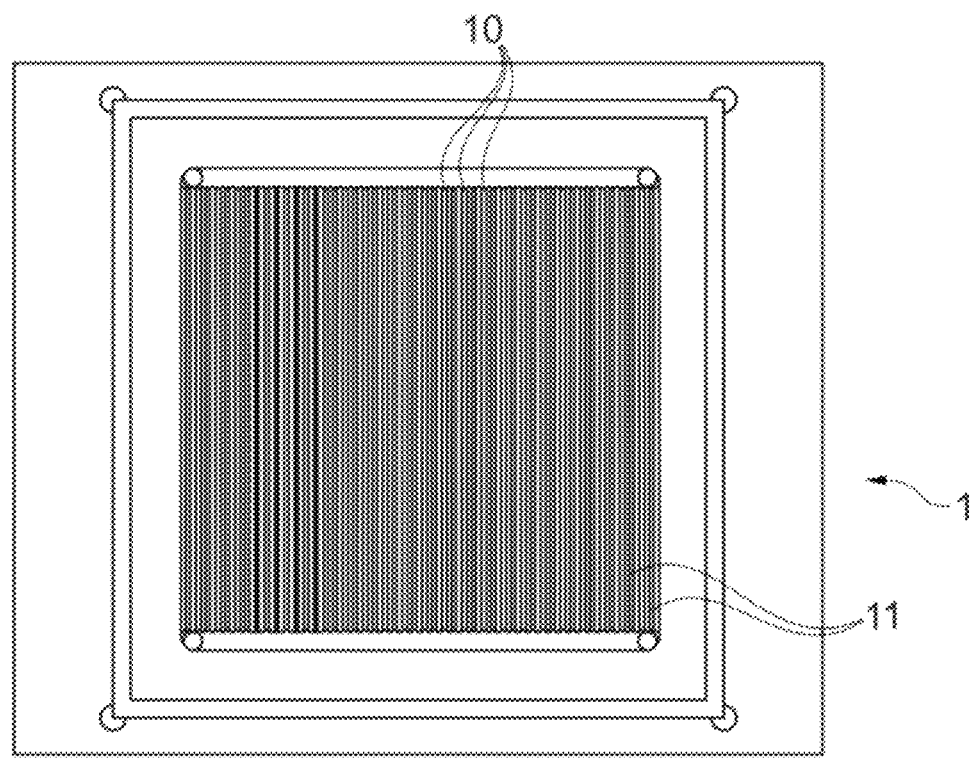
FIG. 3 is a photographic reproduction of a plate according to FIG. 1, obtained by mechanical machining.
Figure 4:
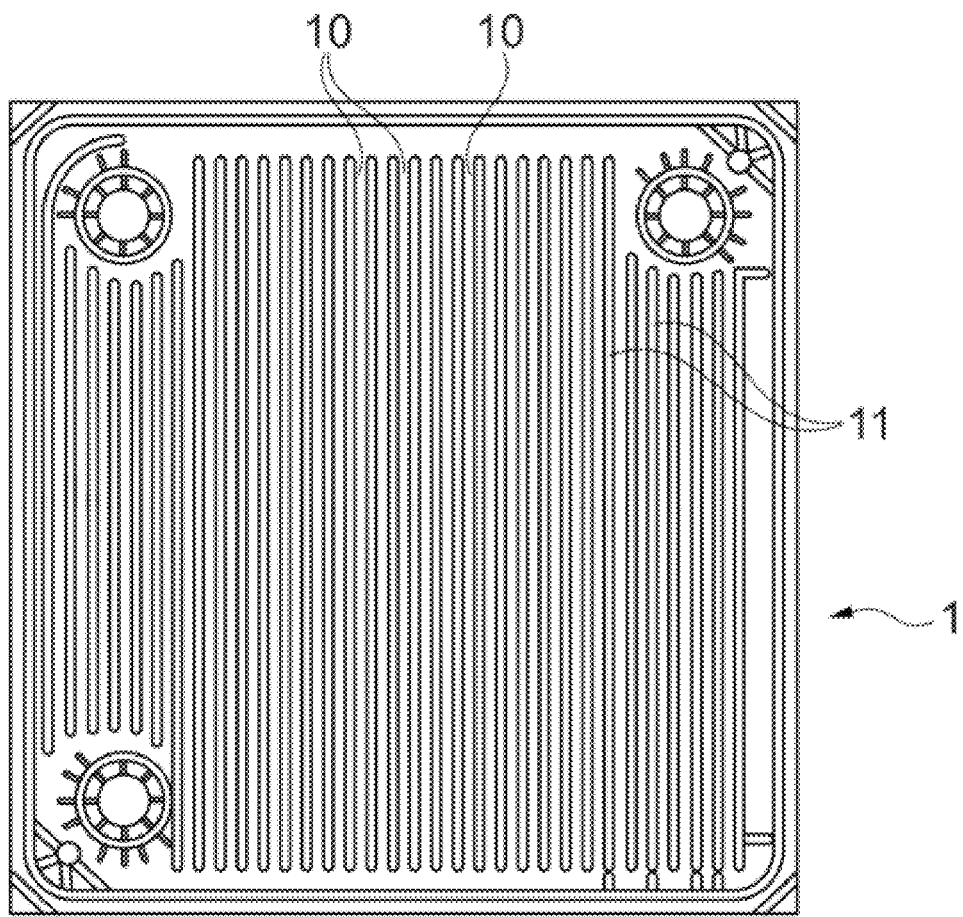
FIG. 4 is a photographic reproduction of a plate according to FIG. 1, obtained by drawing.
Figure 5:
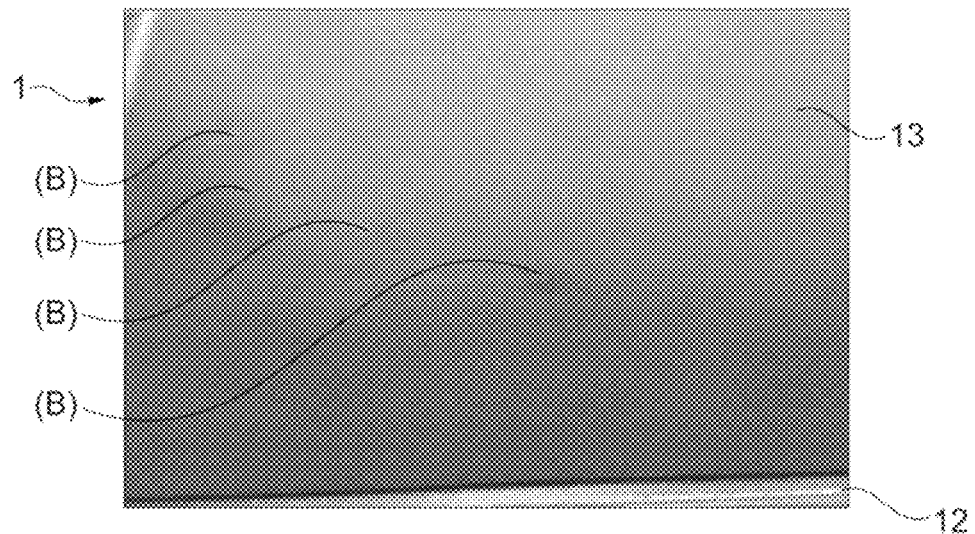
FIG. 5 is a front photographic reproduction on the side of a thick LSM layer once the hot-pressing step has been carried out in accordance with the process according to patent FR2996065B1.
Figure 6:
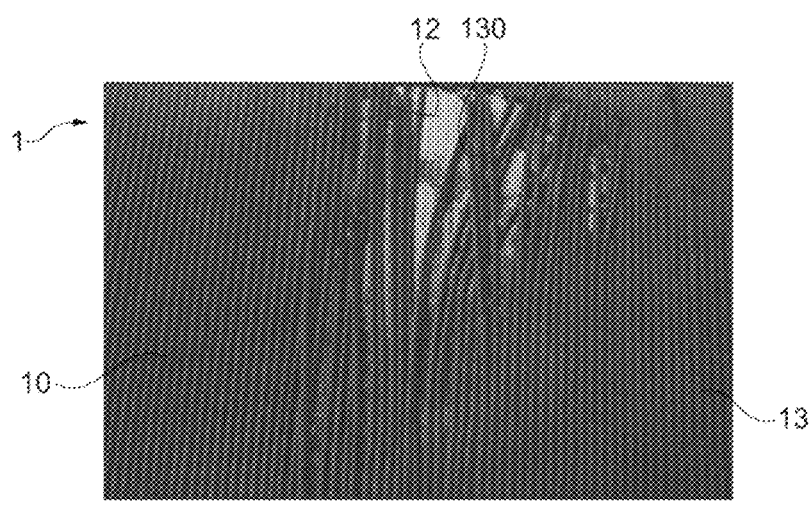
FIG. 6 is a front photographic reproduction on the side of a thick LSM layer once the channel grooving step has been carried out in accordance with the process according to patent FR2996065B1.

The purpose of this removal of material is to suppress, or at the very least reduce, the bubble phenomenon observed, as shown in FIG. 5 with the consequences shown in FIG. 6.

The zones 14 devoid of thick layer are preferably uniformly distributed over the layer 13 and have preferably the shape of cylinders opening onto the underlying metal alloy substrate.

The various steps for preparing an example of a thick ceramic layer with its channels, obtained according to the process of the invention in the targeted applications, i.e. SOFC fuel cells and HTE electrolysers, are described below.

Step a/: a substrate 12 is provided consisting of a commercial ferritic alloy of CROFER 22 APU type, having a thickness of 1.5 mm.

Step b/: manufacture of a green LSM strip.

A mixture is prepared between a compound with a weight of 60 g of lanthanum manganite of formula $La_{0.8}Sr_{0.2}MnO_3$ with 0.8% by weight of oleic acid as dispersant, 15.7% of 2-butanone and 15.7% of ethanol as solvents.

The mixture is milled in a planetary mill. The operating cycle of the planetary mill is as follows:
  speed of rotation: 400 rpm;
  duration: 1 hour.

A weight of 3.2 g of polyvinyl butyral (PVB 90) and 5.5 g of polyethylene glycol (PEG 400) as solvent are then added to the milled mixture, and everything is then mixed using a planetary mill. The operating cycle of the planetary mill is as follows:
  speed of rotation: 200 rpm;
  duration: 10 hours.

The mixture is then deaerated using a mixer of roll type. The operating cycle of the roll mixer is as follows:
  speed of rotation: 20 rpm;
  duration: 24 hours.

The suspension obtained after deaeration is then cast as a tape using a scraper blade. The active height of the blade is equal to 1000 µm. The casting speed is equal to 1.5 m/min. The casting is performed onto a sheet of silicone-treated polymer (polyester) so as to promote the detachment of the tape once dried.

Next, drying of the green tape obtained by casting is performed, in ambient air for a duration of 3 hours.

The dried green tape of LSM is finally chopped to the sizes corresponding to an air electrode in an SOFC cell, against which the tape is intended to bear. The cutting may be performed, for example, using a laser cutting table.

Step c/: material is removed from the tape-cast thick ceramic layer by laser ablation using a $CO_2$ laser.

Figure 8:
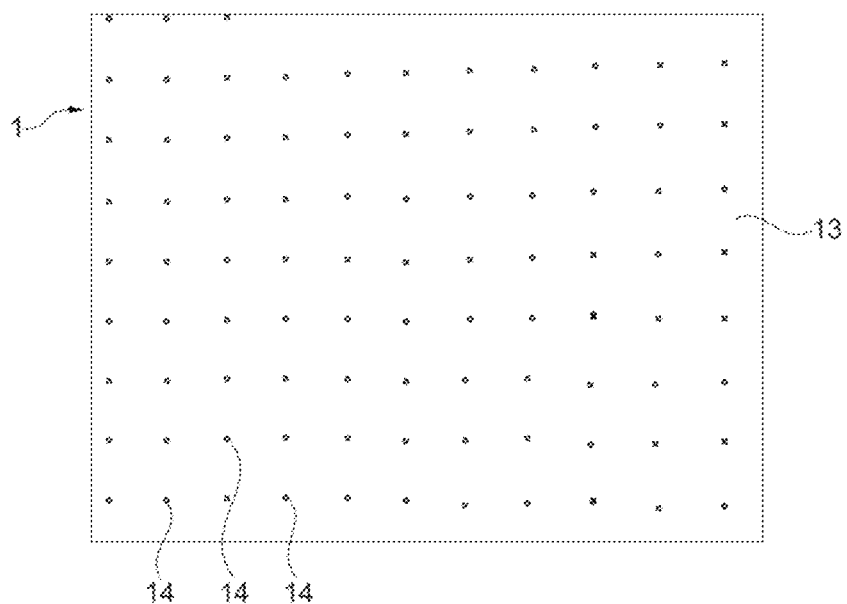
FIG. 8 is a front photographic reproduction on the side of a thick LSM layer before the hot-pressing step in accordance with the process according to the invention.

As shown in FIG. 8, the zones 14 devoid of material have a cylindrical shape and are distributed uniformly over the surface of the layer 13.

By way of example, each of these zones 14 has a diameter of 0.1 mm and the density of the zones 14 is around 1 per $cm^2$.

Step d/: hot pressing

The green tape of LSM is then placed on the substrate 12 and is then welded thereto by hot-pressing using a press. The thickness of the green tape of LSM is 325 µm.

The operating cycle of the press is as follows:
  pressing force: 1 $kg/mm^2$;
  pressing duration: 2 hours;
  regulated temperature of the two press plates: 80° C.

After cooling to room temperature, the assembly prepared between the green tape of LSM and the thin sheet of ferritic steel is removed from the press.

Step e/: Production of the grooves

Grooving is performed by laser ablation of the green tape of LSM. The ablation is performed using a flatbed plotter equipped with a $CO_2$ laser of variable power up to a maximum power of 50 watts. The speed of movement of the laser is also variable, up to a maximum speed of 2 cm/s. The use of such a machine is particularly advantageous since it makes it possible by means of its variable operating characteristics to burn, i.e. to perform abrasion, more or less deeply the polymers constituting the green tape, which thus releases the associated charge, the LSM. More or less deep grooves (furrows) may thus be dug. Where appropriate, several passes of the $CO_2$ laser over the green tape may be performed to increase the depth and/or width of the grooves to a greater or lesser extent.

After this step e/, it is observed that the scrap rate of the components 1 thus manufactured is less than 1%.

The invention is not limited to the examples that have just been described; in particular, characteristics of the examples illustrated may be combined within variants not shown.

Other variants and improvements may be envisaged without however departing from the scope of the invention.

LIST OF REFERENCES CITED

[1]. J. W. Fergus, "*Metallic interconnects for solid oxide fuel cells*", Mater. Sci. Eng. A 397 (2005) 271-283.

[2]. W. J. Quadakkers, J. Piron-Abellan, V. Shemet, L. Singheiser, "*Metallic interconnectors for solid oxide fuel cells—a review*", Mat. High Temp. 20 (2) (2003) 115-127.

[3]. Z. Yang, K. Scott Weil, D. M. Paxton, J. W. Stevenson, "*Selection and Evaluation of Heat-Resistant Alloys for SOFC Interconnect Applications*", J. Electrochem. Soc. 150 (9) (2003) A1188-A1201.

[4]. J. E. Hammer, S. J. Laney, R. W. Jackson, K. Coyne, F. S. Pettit, G. H. Meier, "*The Oxidation of Ferritic Stainless Steels in Simulated Solid-Oxide Fuel-Cell Atmospheres, Oxid. Met*". 67(1/2) (2007) 1-38.

[5]. S. J. Geng et al., "*Investigation on Haynes 242 Alloy as SOFC Interconnect in Simulated Anode Environment*", Electrochemical and Solid-State Letters, 9 (4) (2006) A211-A214.

[6]. N. Shaigan et al., "*A review of recent progress in coatings, surface modifications and alloy developments for solid oxide fuel cell ferritic stainless-steel interconnects*", J. Power Sources 195 (2010) 1529-1542.

[7]. Xiango Li, International Journal of hydrogen Energy 30 (2005) 359-371.

The invention claimed is:

1. A process for preparing a component, the process comprising:
  preparing a substrate made of metal alloy of chromia-forming type, a base element of which being iron or nickel, the substrate having two main flat faces;
  tape casting a thick ceramic layer, thereby producing a tape-cast thick ceramic layer;
  locally removing at one or more locations of material of the tape-cast thick ceramic layer;
  hot pressing a green thick ceramic layer tape; and
  grooving the thick ceramic layer so as to delimit channels that are suitable for distributing and/or collecting gases,
  wherein the locally removing is carried out before the hot pressing.

2. The process of claim 1, wherein the locally removing is carried out by laser ablation.

3. The process of claim 1, wherein the locally removing is carried out by a $CO_2$ laser.

4. The process of claim 1, wherein removed material zones forms holes, and
  wherein each hole has a surface area in a range of $10^{-9}$ to 10 $mm^2$.

5. The process of claim 1, wherein removed material zones are uniformly distributed on a surface of the thick ceramic layer.

6. The process of claim 1, wherein removed material zones each have a cylinder shape opening onto the substrate made of the metal alloy.

7. The process of claim 1, wherein the grooving is carried out by laser ablation before carrying out the hot-pressing.

8. The process of claim 1, wherein the hot pressing is carried out at a temperature in a range of from 60 to 130° C.

9. The process of claim 1, wherein the hot pressing is carried out for less than 2 h.

10. The process of claim 1, wherein the material of the thick ceramic layer is
a lanthanum manganite of formula $La_{1-x}Sr_xMO_3$ with M comprising Ni, Fe, Co, Mn, and/or Cr,
a lamellar structure material, or
another electrically conductive perovskite oxide.

11. The process of claim 1, wherein a thickness of the thick ceramic layer is in a range of from 30 to 800 µm.

12. The process of claim 1, wherein the lamellar structure material is present and comprises a lanthanide nickelate of formula $Ln_2NiO_4$, with Ln being La, Nd, and/or Pr.

13. A method of making a fuel cell, the method comprising:
carrying out the method of claim 1 to form the component; and
forming the fuel cell using the component as an interconnector.

14. A method of making a high-temperature electrolyzer, the method comprising:
carrying out the method of claim 1 to form the component; and
forming the high-temperature electrolyzer using the component as an interconnector.

15. The process of claim 1, wherein removed material zones forms holes,
wherein each hole has a surface area in a range of from $10^{-9}$ to 10 $mm^2$, and
wherein the holes are present in a range of from 0.01 to 1000 per cm.

16. A process for preparing a component, the process comprising:
preparing a substrate made of metal alloy of chromia-forming type, a base element of which being iron or nickel, the substrate having two main flat faces;
tape casting a thick ceramic layer, thereby producing a tape-cast thick ceramic layer;
locally removing at one or more locations of material of the tape-cast thick ceramic layer;
hot pressing a green thick ceramic layer tape; and
grooving the thick ceramic layer so as to delimit channels that are suitable for distributing and/or collecting gases,
wherein removed material zones forms holes, and
wherein each hole has a surface area in a range of $10^{-9}$ to 10 $mm^2$.

17. The process of claim 16, wherein the locally removing is carried out by laser ablation.

18. The process of claim 16, wherein the locally removing is carried out by a $CO_2$ laser.

19. The process of claim 16, wherein the removed material zones are uniformly distributed on a surface of the thick ceramic layer.

20. The process of claim 16, wherein the removed material zones each have a cylinder shape opening onto the substrate made of the metal alloy.

* * * * *